United States Patent [19]

Nguyen

[11] Patent Number: 5,073,714
[45] Date of Patent: Dec. 17, 1991

[54] METHOD AND APPARATUS FOR DETECTING AMPLITUDE AND FREQUENCY OF WEB FLUTTER USING INFRARED OPTICAL SENSOR

[75] Inventor: Dong D. Nguyen, Lawrenceville, N.J.

[73] Assignee: Union Camp Corporation, Wayne, N.J.

[21] Appl. No.: 527,216

[22] Filed: May 22, 1990

[51] Int. Cl.$^5$ ............................................. G01S 17/08
[52] U.S. Cl. .................................. 250/341; 250/338.1; 250/340
[58] Field of Search .................... 250/341, 340, 338.1, 250/571

[56] References Cited

U.S. PATENT DOCUMENTS

| | | | |
|---|---|---|---|
| 3,703,097 | 11/1972 | Kilpatrich et al. | 73/159 |
| 3,892,492 | 7/1975 | Eichenberger | 356/434 |
| 3,906,232 | 9/1975 | Meihofer | 250/341 |
| 4,276,910 | 7/1981 | Eichenberger | 139/273 A |
| 4,501,642 | 2/1985 | Wells | 162/198 |
| 4,637,727 | 1/1987 | Ahola et al. | 356/373 |

Primary Examiner—Constantine Hannaher
Attorney, Agent, or Firm—Edward J. Sites

[57] ABSTRACT

Web flutter in a papermaking machine is monitored by a device which illuminates a portion of the web with infrared light and uses an infrared sensor to monitor the resulting infrared light scattered back from the web. Preferably two infrared light transmitters are used which are angled from each other to insure that light is scattered to the sensor independently of the orientation of the web.

17 Claims, 3 Drawing Sheets

METHOD AND APPARATUS FOR DETECTING AMPLITUDE AND FREQUENCY OF WEB FLUTTER USING INFRARED OPTICAL SENSOR

BACKGROUND OF THE INVENTION

1. Field of Invention

This invention pertains to a method and apparatus for detecting and measuring the flutter of free-standing web material in a web handling machine such as a paper web in a papermaking machine, and more particularly, by a method and device wherein the web flutter is determined from infrared light scattered from the web.

2. Brief Description of the Prior Art

Most paper is presently in the form of a continuous sheet of a preselected width in a papermaking machine. This sheet is usually called a paper web. During the manufacturing process, the paper web undergoes various treatments—including, for example, exposure to air jets or ventilation air for drying purposes—which cause complicated oscillatory motions of the web similar to the motions experienced by a flag. These motions, usually called flutter, can produce undesirable tensional forces on the web which can lead to edge cracks and/or web wrinkling which can cause papermachine breaks. Therefore, it is important in the paper industry to monitor web flutter to determine its characteristics, and sources.

Attempts have been in the past to develop methods and devices for monitoring and determining web flutter in a papermaking machine. However, these efforts yielded unsatisfactory results. For example, U.S. Pat. No. 4,501,642 to Wells discloses a method of paper tension control including a light source directing a light normal to the nominal plane of the web, and a light detector for detecting the light reflected from the web. However, this device cannot monitor paper web flutter with significant amplitude because as the web oscillates through its motions, the reflected light quickly surpasses the range of the light detector. Furthermore, the use of visible light is undesirable because, unless the measurement is taken in total darkness, the light sensor is also sensitive to ambient light, thereby confusing the measurements. Also, the sensor sensitivity can be quickly diminished due to the accumulation of fiber dust.

U.S. Pat. No. 4,637,727 to Ahola discloses a device for analyzing the reciprocating motion of a paper web by measuring the time required for a light beam to strike the web and return to the transmitter. This device needs very accurate elements for precise measurements, and in a manufacturing environment is susceptible to machine vibration and dust contamination. Furthermore, it also discloses a light sensor with limited angular range.

U.S. Pat. No. 3,703,097 uses an array of noncontacting proximity sensors to measure the flatness of sheet material. To remove substantially all internal compressive strains, the sheet is placed in tension, and the proximity sensors disposed at a base line are used to obtain a first set of measurements for the sheet on one surface. The sheet is reversed and a second set of measurements are obtained for the second surface of the sheet. The two sets of measurements are averaged to obtain an accurate transversal profile for the sheet.

SUMMARY OF THE INVENTION

In view of the above-mentioned disadvantages of the prior art, it is an objective of the present invention to provide an accurate but relatively simple method and device for measuring web flutter.

A further objective is to provide a device which has few components so that it can be placed easily along the paper web in a papermaking machine. The device should be able to monitor web flutter independent of web location and orientation.

In accordance with the present invention, web flutter is detected by sensing infrared light scattered from the web in a direction and at a distance normal to the nominal web plane and then determining the intensity of the infrared light. This intensity is proportional to the instantaneous distance between the infrared light sensor and the web. The infrared light incident on and scattered by the web is generated from a plurality of infrared light sources disposed at preselected locations with respect to the sensor, and positioned so that light incident from at least one of the sources is sensed by the sensor.

DETAILED DESCRIPTION OF THE INVENTION

Figure 1:
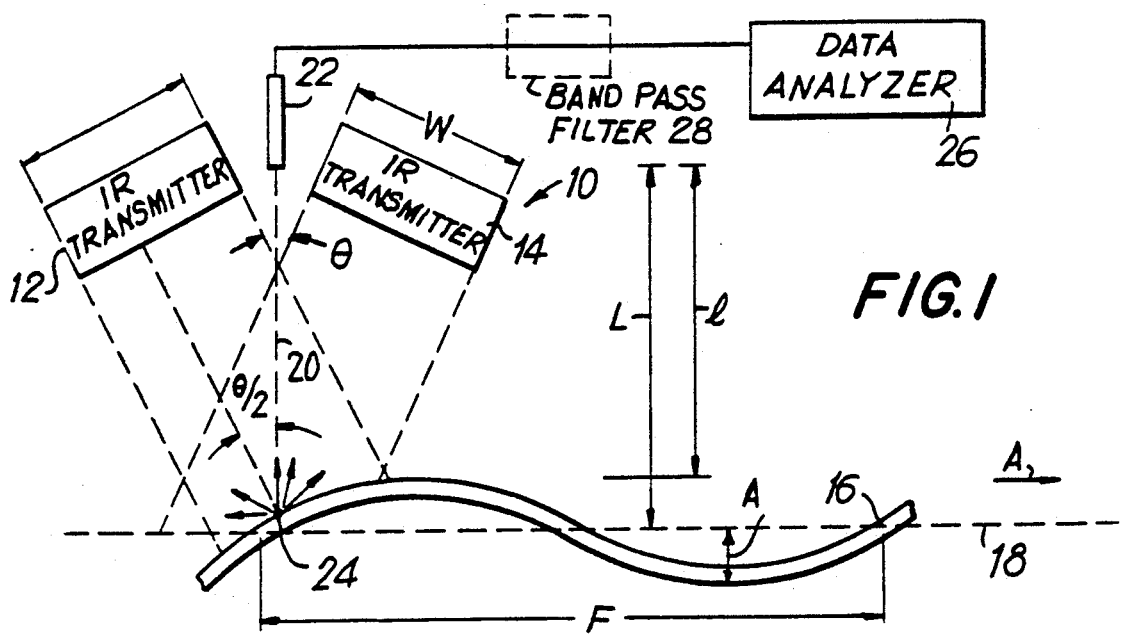
FIG. 1 shows an elevational view of a device constructed in accordance with this invention for detecting web flutter.

Referring now to the drawings, and more particularly to FIG. 1, a device 10 constructed in accordance with this invention includes a first and second IR source 12 and 14 arranged for directing a relatively wide but thin beam of light toward a paper web 16. Each source may be for example an IR source generated by a light emitting diode (LED) and has a fiber optics membrane which is 1.5 inches wide by 0.05 inches thick.

The web is moving in direction indicated by arrow A along a nominal paper web plane 18. (In other words, without flutter, web 16 would lie in plane 18). The IR sources are disposed symmetrically at an angle $\Theta/2$ with respect to a line 20 normal to plane 18 as shown, angle $\Theta$ being the angle between the transmitters 12, 14.

Figure 2:
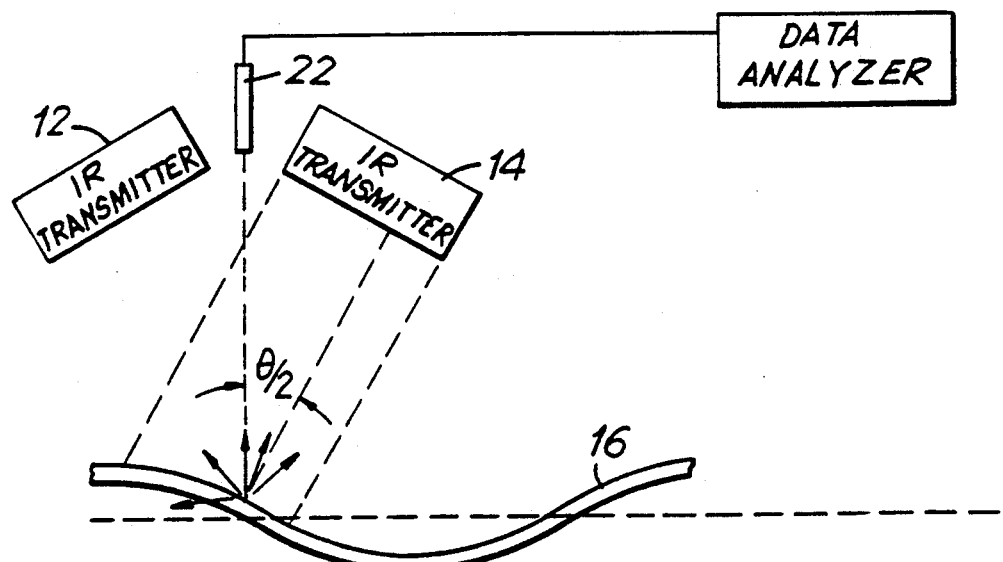
FIG. 2 shows an elevational view similar to FIG. 1 with the paper web curled in a different direction.

The device also includes a light point sensor 22 disposed on line 20 normal to plane 18 to sense IR light scattered from the paper web 16. The point sensor may be for example an IR photosensitive diode transistor made by Scientific Technology Inc. in Hayward, Calif. The light from the transmitters 12, 14 is highly columnated. However, the paper web has a rough surface which scatters the beams in different directions at point 24, as shown in FIG. 1 for a beam from source 12. In the configuration of FIG. 1, some of the infrared light scattered at the point of incidence 24 between the web 16 and line 20 propagates along line 20 and is detected by the sensor 22. As the web 16 continues to flutter it changes to the configuration shown in FIG. 2 wherein light from transmitter 14 is intercepted by sensor 22. Thus, light from at least one of the transmitters 12 or 14 is intercepted by the sensor 22 depending on the instantaneous position of web 18.

Figure 4:
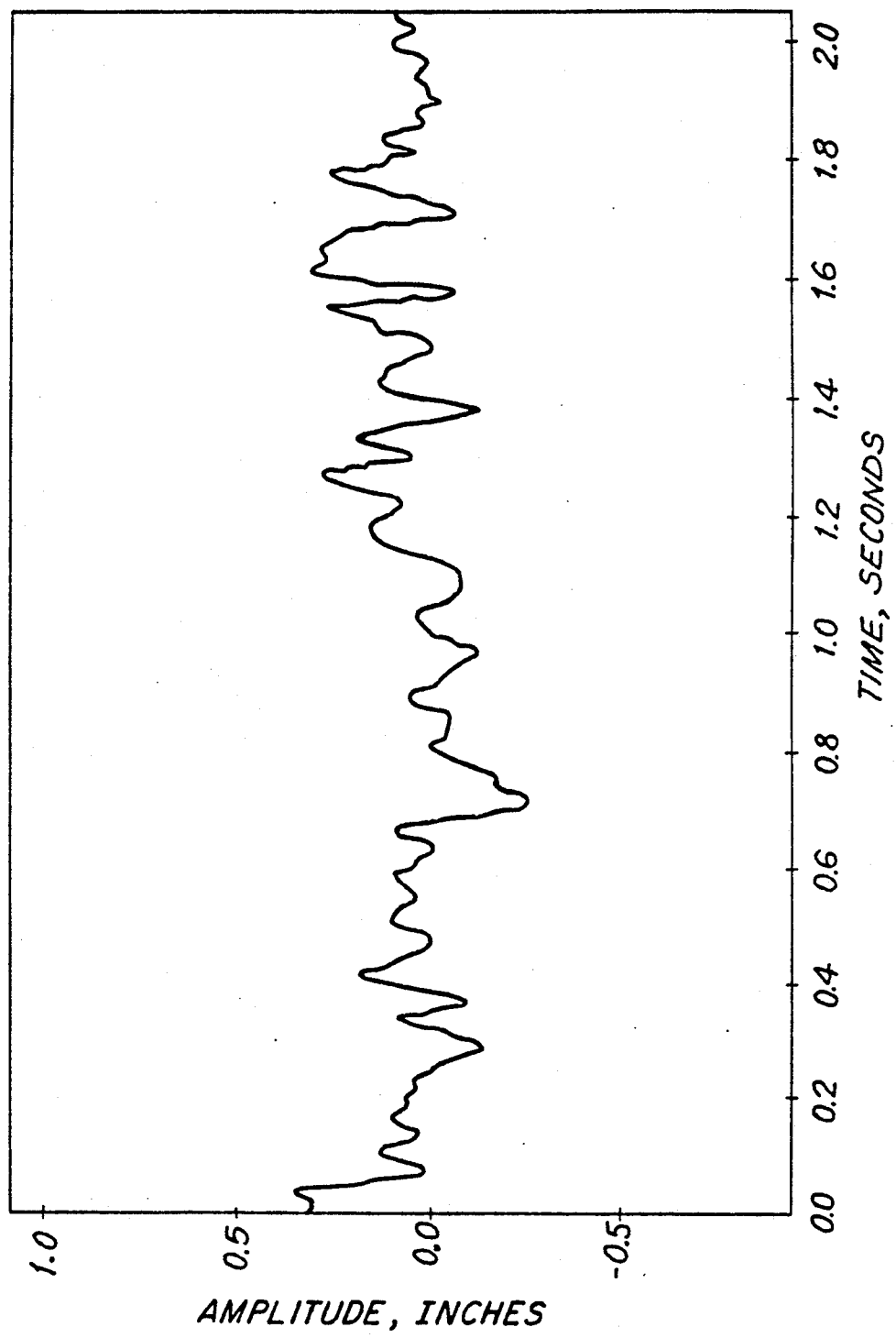
FIGS. 4 and 5 show a typical real-time response of the probe, and the calibration curve of the probe response vs. the video data respectively.

Because of the scattering effect of the web on the IR light, the intensity of the IR light sensed by sensor 22 is inversely proportional to the distance 1 between the sensor 22 and the web 16. This distance is evaluated by feeding the output of the sensor 22 into a data processor 26. The device 10 can be calibrated in a number of different ways. For example, a sample may be disposed sequentially along line 20 at various distances along line 20 and the resulting sensor output may be recorded automatically by data analyzer 26 for comparison with measurements taken from a web of known movement or from a video camera. For this purpose the data analyzer may include for example a microprocessor. A real-time tracing of flutter at sheet edge is included in FIG. 4.

Figure 5:
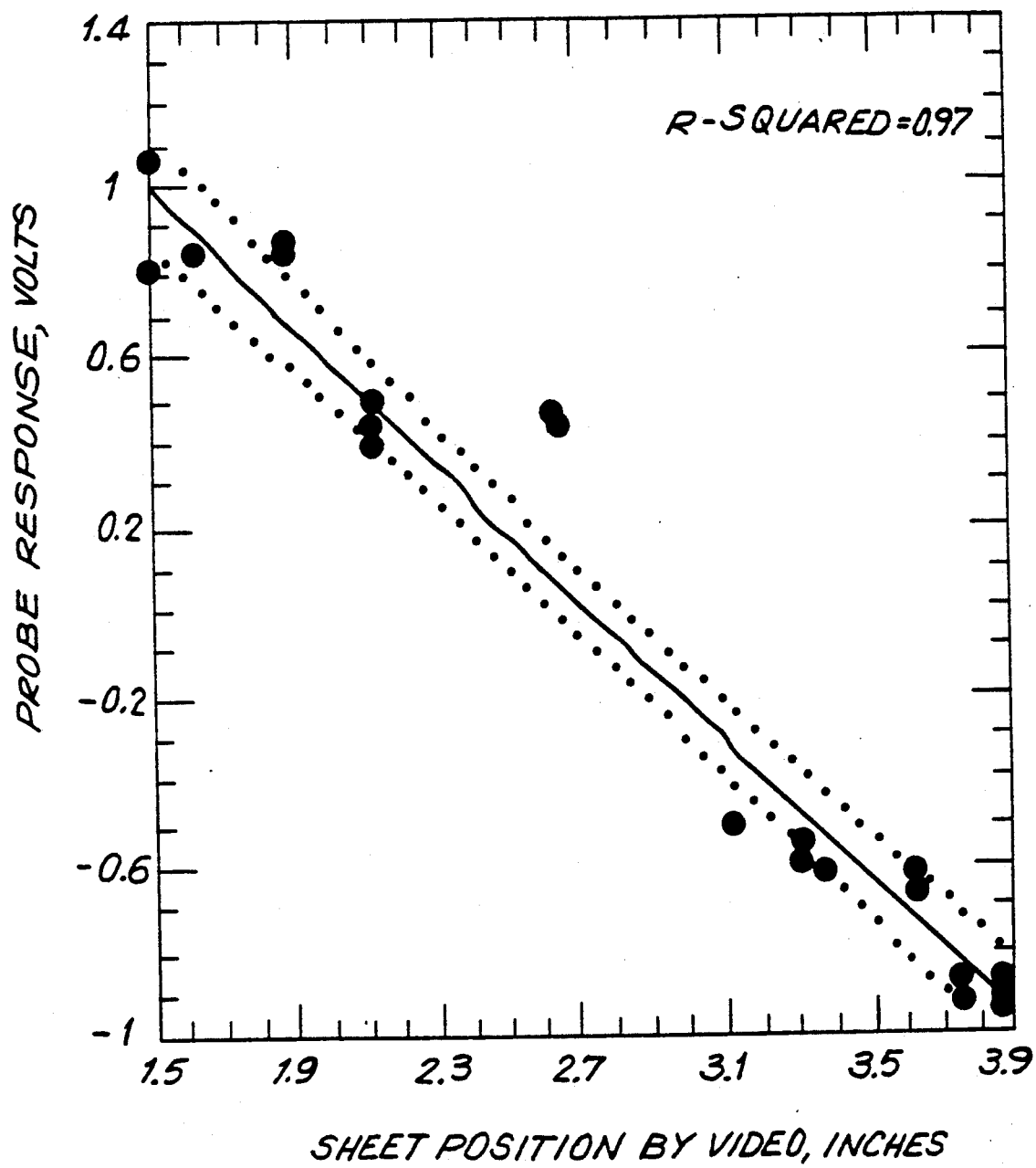

In FIG. 5 the solid continuous line indicates the response of an apparatus constructed in accordance with this invention. The two dotted lines disposed on either side of the solid line indicate the 95% confidence levels. The round bullets indicate the corresponding measurements obtained using a video camera. The operability of the device 10 to the aspect ratio of the web flutter is dependent on the distance L between the sensor 22 and plane 18, the width W of the beams from transmitters 12 and 14 and the angle $\Theta$ between the beams. (The term aspect ratio refers to the ratio between the flutter amplitude A and the flutter wavelength V shown in FIG. 3.) For a flutter with a flutter amplitude A of 1.5 inches, a device with the following parameters was found to operate satisfactorily: L=3.5 inches, W=1.5 inches and $\Theta=35°$.

Figure 3:
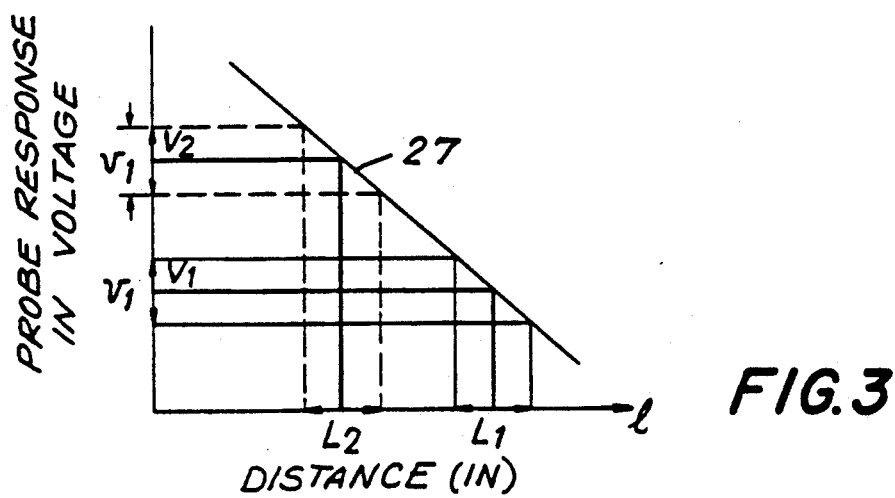
FIG. 3 shows a graph of the web position vis-a-vis the light sensor response.

As previously mentioned, the response of sensor 22 to light scattered by web 16 is linear. This response is shown in FIG. 3 as a straight line 27, with the horizontal axis representing the distance 1 between the probe 22 and the web 16. For example if the nominal plane 18 is a distance $L_1$ from the sensor and the web flutters at an amplitude $A_1$, the sensor generates a voltage signal V(t) approximated by $$V(t) = V_1 + A_1 \sin nt,$$

where $V_1$ is a dc offset voltage corresponding to the nominal position of plane 18 at distance $L_1$, and n is the flutter phase angle in time.

However, it was found that in addition to the flutter having a frequency in the range of 0.5-20 Hz, the paper web 16 may be subjected to other motions of very low frequencies which causes the plane 18 to drift either up or down. For example over a period of time, the plane 18 may drift from a first distance $L_1$ from sensor 22 to a distance $L_2$ somewhat closer to the sensor. In this second position the output of sensor becomes:

$$V(t) = V_2 + A_1 \sin nt$$

where $V_2$ corresponds to the dc offset due to the nominal position of plane 18 at distance $L_2$.

In order to eliminate this effect, preferably a filter 28 is provided (as indicated in dotted line in FIG. 1) prior to the analyzer. The filter may be, for example, a band pass or a high pass filter designed to eliminate all signals having frequencies outside the frequency range of interest.

In the Figures, the device 10 is shown in the orientation required to monitor machine-direction flutter. The same device may be oriented perpendicularly to direction A to thereby monitor flutter in the cross-machine direction. Numerous other modifications may be made to the invention without departing from its scope as defined in the appended claims.

What is claimed is:

1. A device for monitoring the flutter of a web moving along a nominal plane, said device comprising:
   a. a plurality of infrared light transmitter means for generating reflected light beams from an illuminated paper web portion at all web configuration or deformation caused by flutter; and
   b. infrared light sensor means disposed at a preselected distance from said nominal plane for sensing infrared light scattered from said paper web, said infrared light generating an electrical signal related to the distance between said infrared light sensor means and said web.

2. The device of claim 1 wherein said plurality of infrared transmitter means are disposed in a preselected direction relative to the direction of surface wave propagation on said web.

3. The device of claim 1 wherein said plurality of infrared transmitter means are arranged and constructed to direct corresponding light beams at a preselected acute angle with respect to a line normal to said plane.

4. The device of claim 3 wherein said acute angle is constant for each of said infrared transmitter means.

5. In a papermaking machine for making a continuous paper web, said web moving in a preselected web direction along a nominal plane and exhibiting a web flutter, a device for monitoring said web flutter, said device comprising:
   a. a first infrared light transmitter directing a first beam of light at said web at an acute angle with respect to a line normal to said plane;
   b. a second infrared light transmitter directing a second beam of light at said web at said acute angle, said first and second beams having an elongated cross-section; and
   c. a light sensor disposed on said line at a preselected distance form said plane, said light sensor detecting infrared light incident on said web and scattered by said web, said light sensor generating an electrical signal related to the distance from said sensor to said web.

6. The device of claim 5 wherein said first and second transmitters are disposed symmetrically with respect to said line.

7. The device of claim 5 further comprising signal processing means for processing said electrical signal to determine the instantaneous distance from said sensor to said web.

8. The device of claim 7 further comprising filter means for filtering said signal to eliminate dc biasing.

9. The device of claim 5 wherein said device is disposed in a direction parallel to said web direction.

10. The device of claim 5 wherein said device is disposed in a direction perpendicular to said web direction.

11. A method for monitoring the flutter of a paper web moving in a preselected web direction along a nominal plane in a papermaking machine comprising the steps of:
   a. directing infrared light at a preselected portion of the web;
   b. sensing the resulting infrared light scattered by said web; and
   c. generating an electrical signal corresponding to said scattered light.

12. The method of claim 11 wherein said infrared light is generated by two transmitters oriented in a transverse direction related to direction of surface wave propagation on said web.

13. The method of claim 12 wherein said transmitters generated corresponding light beams, said light beams having an elongated cross-section.

14. The method of claim 13 wherein said cross-section is elongated in a direction perpendicular to direction of surface wave propagation on said web.

15. The method of claim 13 wherein said beams are directed at an acute angle with respect to a nominal plane of movement of said web.

16. The method of claim 15 wherein said beams are generated symmetrically with respect to a line normal to said plane.

17. The method of claim 11 wherein the resulting infrared light is sensed at a preselected distance from said nominal plane.

* * * * *